United States Patent [19]
Morita

[11] Patent Number: 5,463,614
[45] Date of Patent: Oct. 31, 1995

[54] OPTICAL RECORDING MEDIUM HAVING LARGE GUIDE GROOVE TRACK PITCH/MEANDER AMPLITUDE RATIO

[75] Inventor: Seiji Morita, Yokohama, Japan

[73] Assignee: Nikon Corporation, Tokyo, Japan

[21] Appl. No.: 121,254

[22] Filed: Sep. 15, 1993

[30] Foreign Application Priority Data

Sep. 21, 1992 [JP] Japan .................. 4-276604

[51] Int. Cl.[6] .................. G11B 7/24; G11B 21/10
[52] U.S. Cl. .................. 369/275.4; 369/44.13; 369/275.1; 369/278; 360/77.07
[58] Field of Search .................. 369/275.1, 275.4, 369/44.13, 43, 275.3, 44.26, 32, 124, 126.13, 59; 360/77.07

[56] References Cited

U.S. PATENT DOCUMENTS

| | | | |
|---|---|---|---|
| 4,807,211 | 2/1989 | Getreuer | 369/44.13 |
| 4,870,508 | 9/1989 | Van Rosmalen et al. | 369/275.1 |
| 4,942,565 | 7/1990 | Lagadec | 369/59 |
| 4,982,398 | 1/1991 | Yamamoto et al. | 369/44.13 |
| 5,023,856 | 6/1991 | Raaymakers et al. | 369/275.1 |
| 5,210,738 | 5/1993 | Iwata et al. | 369/275.1 |
| 5,303,216 | 4/1994 | Shinoda et al. | 369/44.13 |
| 5,377,178 | 12/1994 | Saito | 369/278 |
| 5,383,169 | 1/1995 | Shinoda et al. | 369/44.13 |
| 5,402,411 | 3/1995 | Maeda et al. | 369/275.1 |

Primary Examiner—Frank Gonzalez
Assistant Examiner—Kim-Kwok Chu
Attorney, Agent, or Firm—Shapiro and Shapiro

[57] ABSTRACT

A writable optical disk with meandering guide grooves is so arranged that a ratio of "track pitch/meander amplitude" is not less than a certain value, for example 57, at least in an out-of-phase portion in which meander of the meandering guide grooves is out of phase on mutually adjacent tracks. Also, the track pitch in the out-of-phase portion is larger than that in an in-phase portion in which meander of the guide grooves is in phase on mutually adjacent tracks.

18 Claims, 4 Drawing Sheets

OPTICAL RECORDING MEDIUM HAVING LARGE GUIDE GROOVE TRACK PITCH/MEANDER AMPLITUDE RATIO

BACKGROUND OF THE INVENTION

1. Field of the Invention

The present invention relates to a writable optical disk, and more particularly to the technology for optical disks having meandering guide grooves, which enables proper reproduction of signals from the meandering guide grooves without influence of adjacent tracks.

2. Related Background Art

For example, a writable compact disk has guide grooves recorded thereon, which meander at a constant carrier frequency of 22050 Hz. When the meandering guide grooves are reproduced, a reproduced signal is obtained with a certain frequency because of fluctuation in light quantity of reflected light. Thus, a linear velocity of the disk can be controlled at a constant value by adjusting a rotational velocity of the disk so as to maintain constant the frequency of reproduced signal corresponding to the fluctuation in the quantity of reflected light. Since the meandering guide grooves include time information, high-speed search of arbitrary position is possible on the disk, using the time information measured from the meandering guide grooves for example.

FIG. 4 and FIG. 5 show the meandering guide grooves 1 formed on a disk. FIG. 4 shows a state in which adjacent guide grooves meander in phase with each other, that is, the appearance of meandering guide grooves formed in an in-phase state. FIG. 5 shows a state in which adjacent guide grooves meander in antiphase to each other, that is, the appearance of meandering guide grooves in an out-of-phase state. Such a conventional optical disk has a track pitch of $p=1.6$ μm and a meander amplitude of $a=0.03$ μm, so that a ratio therebetween $p/a$ is approximately 53 and is maintained constant thereat.

Incidentally, the in-phase state and the out-of-phase state as described above alternately appear at a frequency $f_{beat}$ (HZ). The frequency $f_{beat}$ may be approximated by the following equation, if the carrier frequency of meander is $f_{wob}$ (Hz), the linear velocity in writing or reproducing data is $v_{CLV}$ (m/s), the track pitch of disk is P (μm) and a radial position on disk is r(mm).

$$f_{beat} = (1/2)[(1/(2f_{wob}))\cdot(1/P)\cdot(10^3)\cdot 55\ r + (1/(8f_{wob}))\cdot(v_{CLV}/\pi)\cdot(10^3)] - 1/(4f_{wob})]^{-1}\ (Hz)$$

Since for current writable compact disks $f_{wob}=22050$ (HZ), $V_{CLV}=1.2$ (m/s), $P=1.6$ (μm) and $r=25-58$ (mm), the frequency $f_{beat}$ is approximately 1.4 (Hz) to 0.6 (Hz).

Meanwhile, it is the case in such a writable compact disk that an amplitude of the reproduced signal on reproducing guide grooves in the in-phase state as shown in FIG. 4 is different from that on reproducing guide grooves in the out-of-phase state as shown in FIG. 5. Specifically, FIG. 6 shows a reproduced signal on reproducing guide grooves in the in-phase state, while FIG. 7 shows a reproduced signal on reproducing guide grooves in the out-of-phase state. Namely, leakage of signals from adjacent guide grooves causes such influence that the amplitude of reproduced signal on reproducing the guide grooves in the in-phase state is greater than that on reproducing the guide grooves in the out-of-phase state. Therefore, when such grooves are continuously reproduced, a reproducing signal is output while changing its amplitude depending upon the phase condition, i.e., upon the in-phase state or the out-of-phase state, as shown in FIG. 8.

If there occurs a defocus of the reproducing pickup, unevenness of width or depth of the guide grooves, unevenness of track pitch, unevenness of reflectivity of the recording film, or unevenness of thickness of the disk substrate, the influence is further enhanced to cause problems such as an error in reading a signal of the meandering guide grooves, failure in writing or reproducing correct information, and inability of high-speed search.

SUMMARY OF THE INVENTION

It is an object of the present invention, considering the problems in the conventional writable optical disks as described above, to provide a writable optical disk with meandering guide grooves, which can relieve the influence from adjacent guide grooves at least to prevent the lowering of amplitude in the reproduced signal from meandering guide grooves in the out-of-phase state and thereby to permit proper control using the meandering guide grooves.

It is another object of the present invention to provide a writable optical disk with meandering guide grooves, which can reduce a difference of amplitude between a reproduced signal from guide grooves in the out-of-phase state and a reproduced signal from guide grooves in the in-phase state thereby permitting proper control using the meandering guide grooves.

To achieve the above objects, a writable optical disk according to the present invention is so arranged that a value of "track pitch/meander amplitude" is not less than 57 at least in an out-of-phase portion in which guide grooves meander out of phase on mutually adjacent tracks.

Also, a writable optical disk according to the present invention is so arranged that a track pitch in out-of-phase portion in which guide grooves meander out of phase on mutually adjacent tracks is greater than that in the in-phase portion.

Further, it is preferable in the present invention that the writable optical disk as described is so arranged that the track pitch is almost maximum in the out-of-phase portion in which guide grooves meander out of phase on mutually adjacent tracks, that the track pitch decreases as the phase of meander approaches the in-phase state, and that the track pitch becomes almost minimum in the in-phase portion of the meander phase.

The writable optical disk according to the above constitution is so arranged that the value of "track pitch/meander amplitude" is not less than 57 at least in the out-of-phase portion in which guide grooves meander out of phase on mutually adjacent tracks. Therefore, out-of-phase portion, has a large value of "track pitch/meander amplitude" sufficient enough to prevent the lowering of reproduced signal amplitude in the out-of-phase state, unlike conventional disks in which the out of phase portion is susceptible to influence of adjacent tracks.

When the track pitch in the out-of-phase portion in which guide grooves meander out of phase on mutually adjacent tracks is set greater than that in the in-phase portion in which guide grooves meander in phase on mutually adjacent tracks, the amplitude change is further decreased in the reproduced signal from guide grooves thereby permitting proper and stable control using the guide grooves. In particular, when the optical disk is so arranged that the track pitch is about maximum in the out-of-phase portion of meander phase on adjacent tracks, that the track pitch decreases as the meander phase approaches the in-phase portion, and that the track pitch becomes minimum in the in-phase portion, the amplitude change can be suitably suppressed in the reproduced signal from guide grooves.

The present invention has a further advantage that a high data transfer rate of an optical disk can be readily achieved. In order to increase the value of "track pitch/meander amplitude", it is necessary to increase the track pitch, that is, to broaden a region between a meandering guide groove and a meandering guide groove adjacent thereto. Broadening the region between a certain meandering guide groove and a meandering guide groove adjacent thereto can increase tracks for writing information therein. A plurality of tracks for writing information therein may be formed for example by equally dividing the region. As described, the high data transfer rate can be attained by forming a plurality of tracks (multiple tracks) and simultaneously reproducing information thereon.

Since the present invention relates to the formation of the meandering guide grooves, information such as address and data, time code information, information for CLV control, etc., which is recorded on meandering guide grooves, may be simultaneously transferred. Also, since the CLV method may be employed, the high data density can also be attained.

DESCRIPTION OF THE PREFERRED EMBODIMENTS

Figure 1:
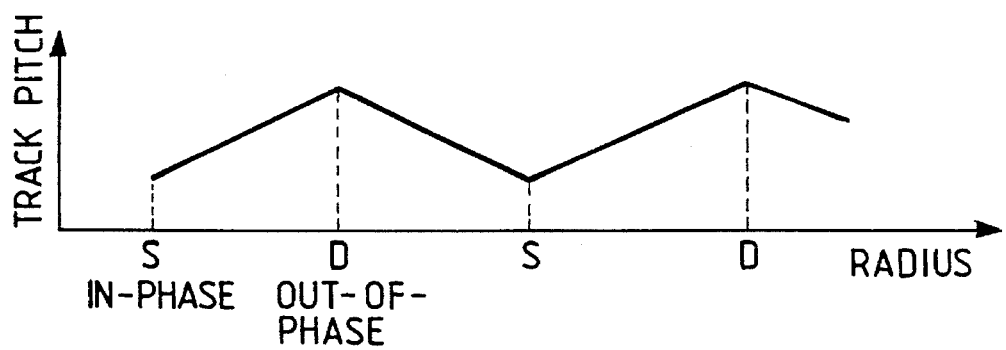
FIG. 1 is a graph to show the relation between radial position and track pitch in a writable optical disk in an embodiment according to the present invention.

The preferred embodiments of the present invention will be described in detail with reference to the drawings. FIG. 1 shows an example of setting of a track pitch on a writable optical disk in an embodiment of the present invention. In FIG. 1, the vertical axis represents the track pitch and the horizontal axis the radius. As shown in this graph, the present embodiment is so arranged that the track pitch is minimum in in-phase portion S and maximum in out-of-phase portion D and that the track pitch gradually changes between the in-phase state and the out-of-phase state. This can suppress the lowering of reproduction amplitude, which could be caused by the influence of adjacent tracks in the out-of-phase state, whereby the control using meandering guide grooves can be carried out in a stable and proper manner.

Figure 2:
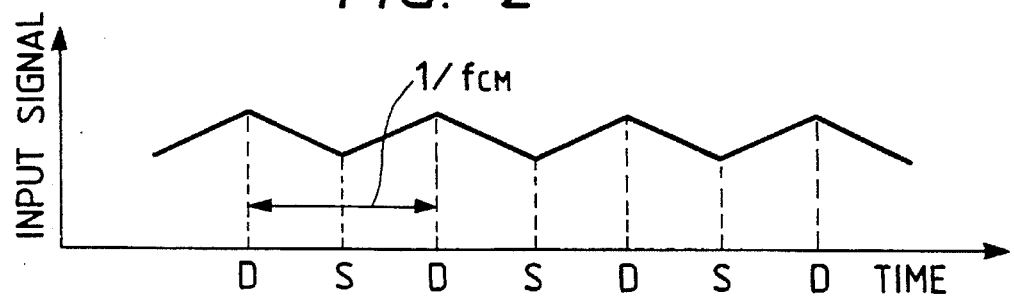
FIG. 2 is a graph to show an example of drive signal applied to a cutting machine to obtain the track pitch as shown in FIG. 1.

FIG. 2 shows the relation between time and input signal into a cutting machine for cutting the meandering grooves to produce the writable optical disk in accordance with the relationship shown in FIG. 1. Specifically, the input signal shown in FIG. 2 is input into a mechanical portion for moving a recording pickup in the cutting machine, so that the track pitch of guide grooves is made different in the in-phase state S from that in the out-of-phase state D. A frequency $f_{CM}$ of the input signal is made coincident with the frequency $f_{beat}$ at which the in-phase state and the out-of-phase state repetitively appear.

Figure 3:
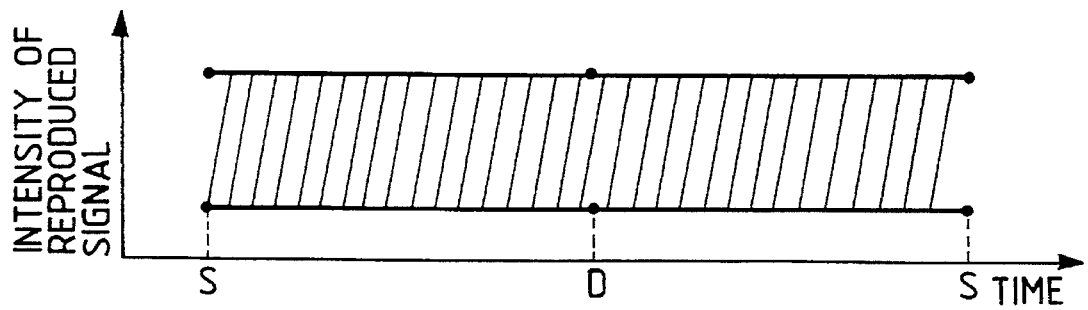
FIG. 3 is a graph to show an example of a reproduced signal from meandering guide grooves in continuous reproduction from the optical disk according to the present invention.
Figure 4:
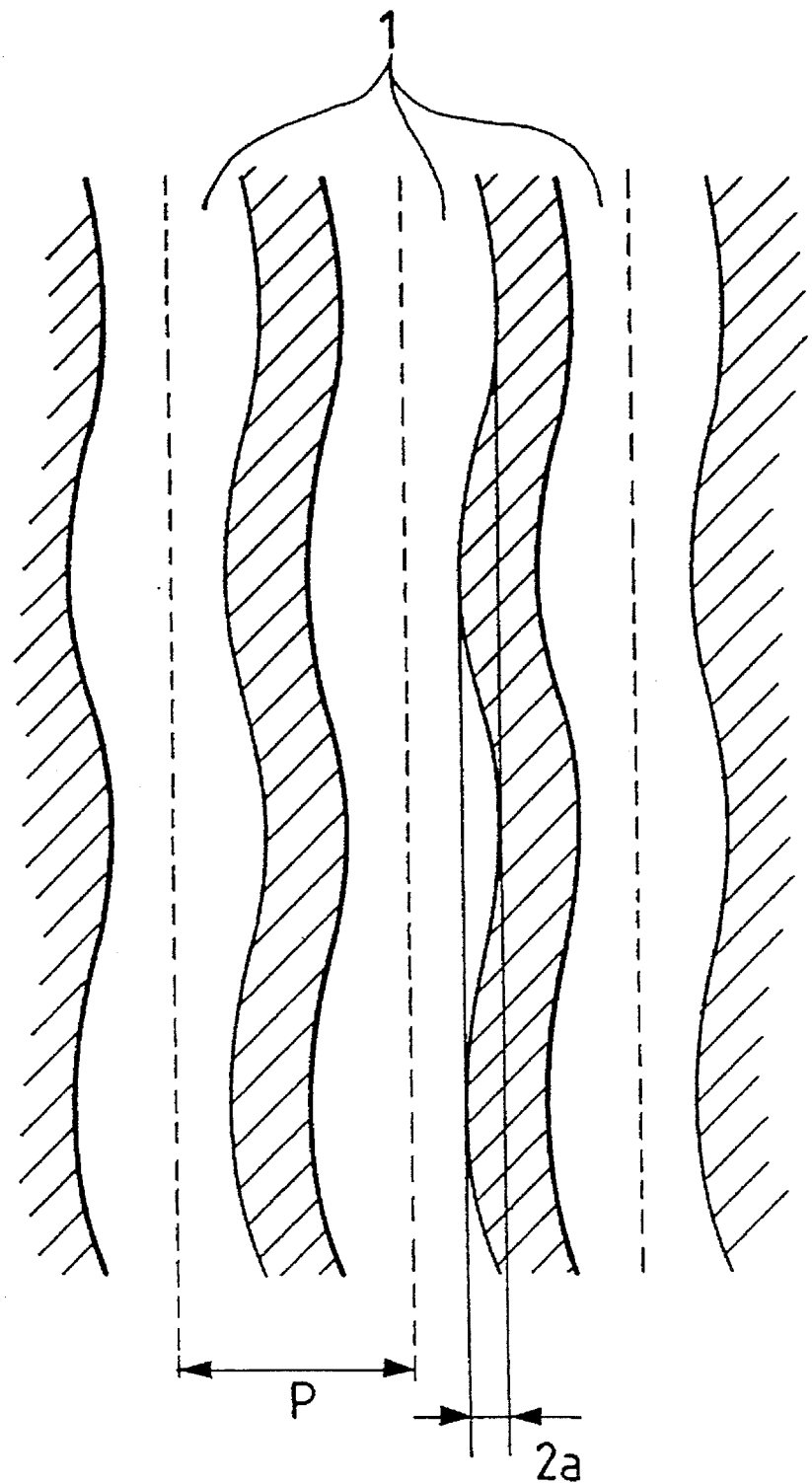
FIG. 4 is an enlarged top plan view to show meandering guide grooves in the in-phase state on an optical disk.
Figure 5:
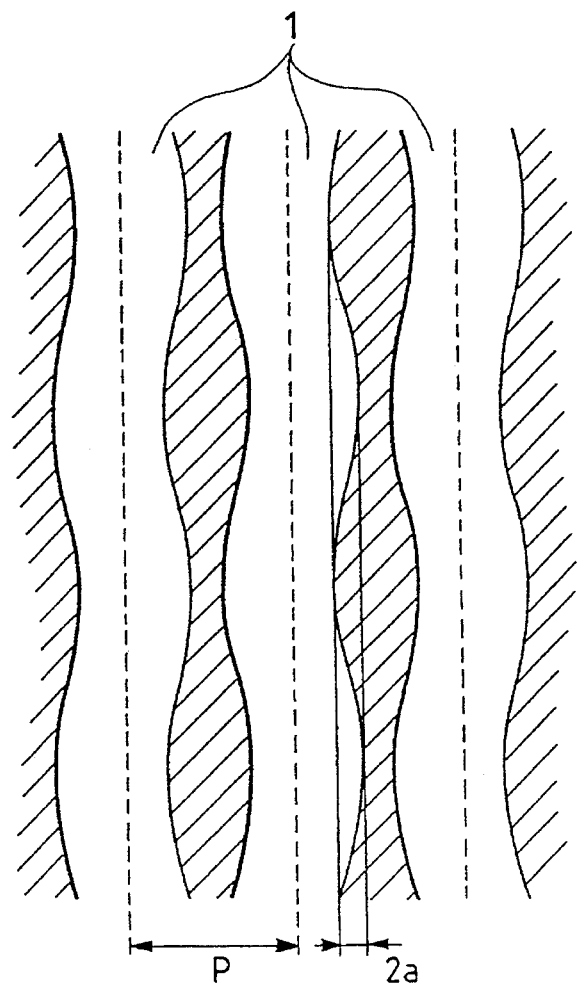
FIG. 5 is an enlarged top plan view to show meandering guide grooves in the out-of-phase state on an optical disk.
Figure 6:
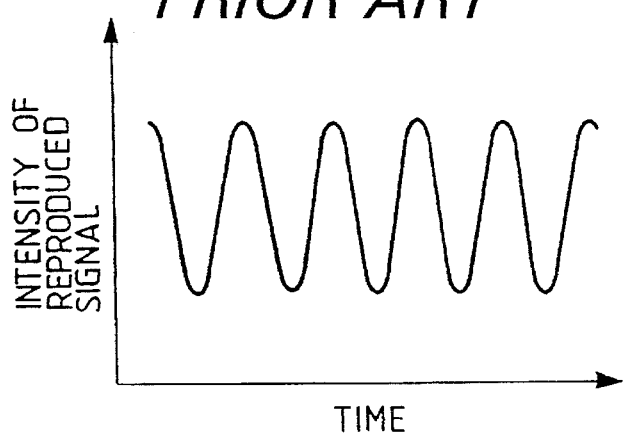
FIG. 6 is a graph to show a reproduced signal obtained in reproduction from meandering guide grooves in the in-phase state.
Figure 7:
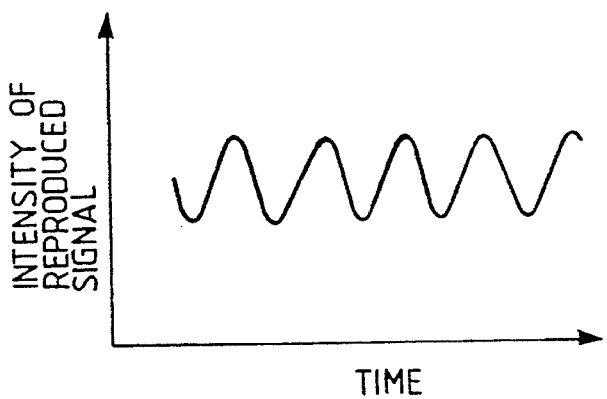
FIG. 7 is a graph to show a reproduced signal obtained in reproduction from meandering guide grooves in the out-of-phase state.
Figure 8:
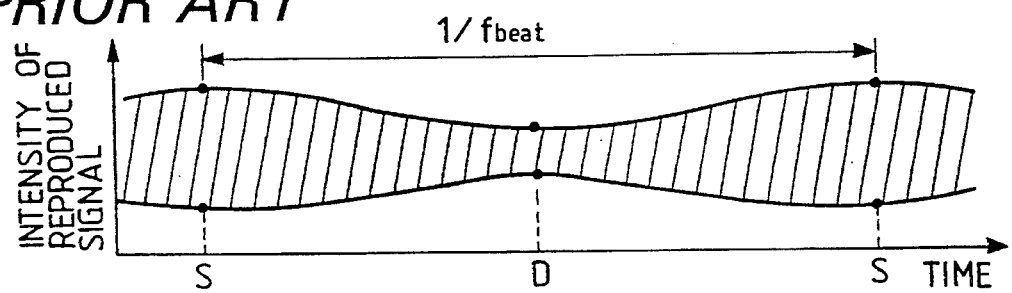
FIG. 8 is a graph to show a reproduced signal obtained in continuous reproduction from meandering guide grooves on a conventional optical disk.

FIG. 3 shows a change in intensity of the reproduced signal obtained by properly setting the track pitch under the control of input signal into the cutting machine as described. As shown in FIG. 3, properly setting the track pitch in the in-phase state S and in the out-of-phase D can provide a reproduced signal with such an intensity that a signal amplitude in the in-phase state is nearly equal to that in the out-of-phase state. This can improve the reliability of control using the meandering guide grooves.

A trial production example of the optical disk as described is next described with specific numerical values.

A glass substrate of 120 mm in outer diameter, 15 mm in inner diameter and 1.2 mm in thickness was first washed. After that, the glass substrate was coated with silane coupling agent. Then a positive photoresist (AZ 1350 manufactured by Hoechst AG) was applied onto the substrate to form a film of about 600 angstroms in thickness. The substrate with photoresist was pre-baked at 100° C. for 30 minutes.

Exposure was next effected on the resist over the surface of glass substrate by the cutting machine with an argon laser of wavelength 457.9 nm to make guide grooves recording. The linear velocity in laser record was 1.2 m/s, the frequency of meander 22050 Hz, an amount of meander 0.03 μm, and the recording power 3 mW.

The track pitch was gradually changed as shown in FIG. 1 so that the track pitch in the in-phase state was 1.50 μm and that in the out-of-phase state 1.72 μm. The cutting was done at 57.3 of "track pitch/meander amplitude" in the out-of-phase state accordingly.

In this example, the signal shown in FIG. 2 was input into a mechanical portion for moving the recording pickup in the cutting machine to change the track pitch of meandering guide grooves. The frequency $f_{CM}$ of this signal was made coincident with the aforementioned frequency $f_{beat}$. Since the cutting was done between 25 mm and 58 mm of radial position, the frequency $f_{CM}$ was changed with change of radial position. In more detail, the frequency $f_{CM}$ was 1.4 Hz at the radial position of 25 mm, the frequency was lowered thereafter by about 0.01 Hz for every advance of 0.5 mm toward the outer periphery, and the frequency reached 0.6 Hz at radius of 58 mm.

As described, the track pitch was changed as to gradually increase from the in-phase state S to the out-of-phase state D but to gradually decrease from the out-of-phase state D to the in-phase state S, as shown in FIG. 1.

This substrate was next developed with inorganic alkaline developer (AZ developer made by Hoechst AG) to form meandering guide grooves on the glass substrate. The width of guide grooves was 1.2 μm.

Using a sputtering apparatus, a SiN film of 700 angstroms in thickness, a TbFeCo film of 1000 angstroms in thickness and a SiN film of 700 angstroms in thickness were next formed in order on the substrate. After that, the thin film surface was protected by bonding a glass substrate thereto through an adhesive.

A signal from the meandering guide grooves on the thus produced optical disk was reproduced by an evaluation drive apparatus having a pickup of wavelength of 780 nm and NA of 0.45. The linear velocity in reproduction was 1.2 m/s and the reproducing power was 0.5 mW.

The reproduction was continuously carried out to cover the in-phase state and the out-of-phase state. The reproduced signal in the continuous reproduction was as shown in FIG. 3, in which the amplitude in the in-phase state S was nearly equal to that in the out-of-phase state D. Thus, the reproduction amplitude was almost constant irrespective of the phase relation between adjacent meandering guide grooves.

Such an improvement is probably for the main reason that the track pitch is so controlled as to make the value of "track pitch/meander amplitude" not less than 57 in the out-of-phase state, whereby the influence of signal leakage from adjacent guide grooves is reduced, which results in nullifying the difference of reproduced signal amplitude. The reason why the value of "track pitch/meander amplitude" was set not less than 57 is as follows. In current compact disks the track pitch is 1.6±0.1 μm. Then (1.6+0.1)/0.03= 56.666 . . . . In the present invention, the value of "track pitch/meander amplitude" in the out-of-phase state is set not less than 57, which is larger than the value of 56.666 . . . , so as to improve the reproduced signal.

As described above, the track pitch of meandering guide grooves is increased at least in the out-of-phase state as compared with that in the conventional disk, whereby the amplitude of reproduced signal from guide grooves can be prevented from lowering in the out-of-phase state, which enables very stable and proper control using the guide grooves, such as constant linear velocity control and high-speed search. When the track pitch of meandering guide grooves is set such that it is over a predetermined value in the portion of out-of-phase state and smaller in the portion of in-phase state, the amplitude of reproduced signal from guide grooves can be controlled to be nearly constant, and therefore the control can be accomplished at higher reliability.

An example of a high data transfer rate optical disk was produced applying the present invention, and will be described in the following.

After a glass substrate was first coated with a photoresist in the same manner as described above, exposure was carried out to form meandering guide grooves of carrier frequency of 22050 Hz at track pitch of 5.6 μm. The meander amplitude was 0.03 μm.

Without varying the track pitch as described above, the effect of the present invention may be achieved if the value of "track pitch/meander amplitude" is not less than 57 (most preferably not less than 100) in the out-of-phase state. In this example the track pitch was set constant at 5.6 μm.

After the substrate was next developed, the thin films were formed and the protection glass was bonded in the same manner as described above to produce an optical disk. The width of meandering guide grooves was 1.1 μm.

Figure 9:
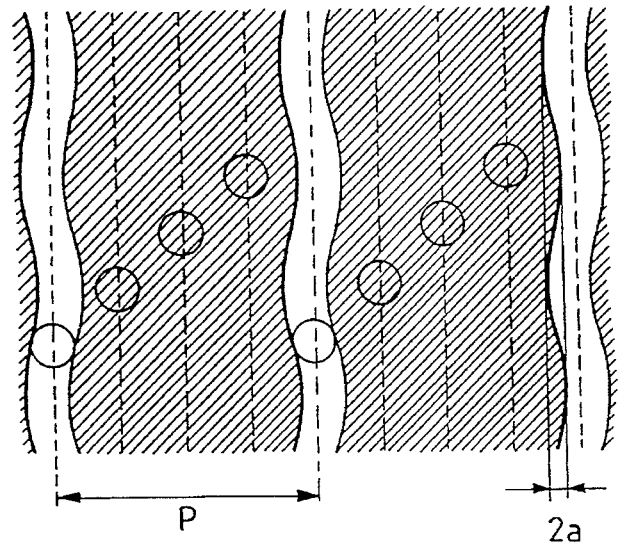
FIG. 9 is an enlarged top plan view to show a writable optical disk in an embodiment of the present invention, during recording or reproduction with 4-beam laser array.

The thus produced optical disk can be used for writing or reproducing information with a plurality of light spots being focused on the optical disk, such as by using array lasers. FIG. 9 shows an example in which four light spots from a 4-beam laser array of wavelength 780 nm are focused through an objective lens of NA 0.55. In this case, four writable tracks are formed at intervals of a quarter of track pitch P=5.6/4=1.4 μm. The optical disk was tested by the evaluation drive apparatus with optical pickup as described above under control of CLV (linear velocity 1.2 m/s). The test results showed that recording and reproduction of information was done without problem at a high data transfer rate four times larger than that in the conventional disk and at a high data density. Also, the reproduced signal of meandering guide grooves had an amplitude with very little fluctuation as shown in FIG. 3, and the meander information was able to be read at bit error rate of not more than $1 \times 10^6$. Further, CLV control clock could be extracted from the meandering guide grooves without problem.

As described above, the optical disk can be made to have a high data transfer rate and a high data density, applying the present invention.

What is claimed is:

1. A writable optical disk having a plurality of tracks with meandering guide grooves, and wherein a ratio of track pitch/meander amplitude is not less than 57 in an out-of-phase portion in which guide grooves meander out of phase on adjacent tracks.

2. A writable optical disk according to claim 1, wherein a track pitch in the out-of-phase portion is greater than that in an in-phase portion in which guide grooves meander in phase on adjacent tracks.

3. A writable optical disk according to claim 2, wherein the track pitch is substantially a maximum in the out-of-phase portion and decreases approaching the in-phase portion, and the track pitch is substantially a minimum in the in-phase portion.

4. A writable optical disk according to claim 2, wherein a frequency $f_{beat}$ at which said track pitch changes satisfies the following equation:

$$f_{beat} = (1/2)[(1/(2f_{wob})) \cdot (1/P) \cdot (10^3) \cdot \{r + (1/(8f_{wob})) \cdot (v_{CLV}/\pi) \cdot (10^3)\} - 1/(4f_{wob})]^{-1} \ (Hz)$$

where $f_{wob}$ is a carrier frequency (Hz) of meander of guide grooves, $v_{CLV}$ is a linear velocity (m/s) in writing or reproducing information, r is a radial position (mm) on the optical disk, and P is an average track pitch (mm) of the optical disk.

5. A writable optical disk according to claim 1, wherein a region between adjacent guide grooves is used as a single writable track or as a plurality of writable tracks.

6. A writable optical disk according to claim 5, wherein the ratio of track pitch/meander amplitude is not less than 100.

7. A constant linear velocity type information writable optical medium, including a plurality of tracks, each having a meandering guide groove for writing information optically in the guide groove, and wherein in a portion where the meandering guide grooves in adjacent tracks are out of phase with each other, a track pitch/meander amplitude ratio is more than 57.

8. A optical medium according to claim 7, wherein a track pitch in the out-of-phase portion is greater than that in an in-phase portion in which guide grooves meander in phase on adjacent tracks.

9. A optical medium according to claim 8, wherein the track pitch is substantially a maximum in the out-of-phase portion and decreases approaching the in-phase portion, and the track pitch is substantially a minimum in the in-phase portion.

10. A optical medium according to claim 8, wherein a frequency $f_{beat}$ at which said track pitch changes satisfies the following equation:

$$f_{beat} = (\tfrac{1}{2})[(1/(2f_{wob})) \cdot (1/P) \cdot (10^3) \cdot \{r + (1/(8f_{wob})) \cdot (v_{CLV}/\pi) \cdot (10^3)\} - 1/(4f_{wob})]^{-1} \ (Hz)$$

where $f_{wob}$ is a carrier frequency (Hz) of meander of guide grooves, $v_{CLV}$ is a linear velocity (m/s) in writing or reproducing information, r is a radial position (mm) on the optical medium, and P is an average track pitch (mm) of the optical medium.

11. A optical medium according to claim 7, wherein a region between adjacent guide grooves is used as a single writable track or as a plurality of writable tracks.

12. A optical medium according to claim 11, wherein the ratio of track pitch/meander amplitude is not less than 100.

13. An information writable optical medium, including a plurality of tracks with meandering guide grooves, and wherein a ratio of track pitch/meander amplitude in an out-of-phase portion in which guide grooves meander out of phase on adjacent tracks has a sufficiently large value so as to substantially avoid reduction of signal amplitude due to influence between the adjacent tracks during signal reproduction from the guide grooves thereof.

14. A optical medium according to claim 13, wherein a track pitch in the out-of-phase portion is greater than that in an in-phase portion in which guide grooves meander in phase on adjacent tracks.

15. A optical medium according to claim 14, wherein the track pitch is substantially a maximum in the out-of-phase portion and decreases approaching the in-phase portion, and the track pitch is substantially a minimum in the in-phase portion.

16. A optical medium according to claim 14, wherein a frequency $f_{beat}$ at which said track pitch changes satisfies the following equation:

$$f_{beat} = (\tfrac{1}{2})[(1/(2f_{wob})) \cdot (1/P) \cdot (10^3) \cdot \{r + (1/(8f_{wob})) \cdot (v_{CLV}/\pi) \cdot (10^3)\} - 1/(4f_{wob})]^{-1} \ (Hz)$$

where $f_{wob}$ is a carrier frequency (Hz) of meander of guide grooves, $v_{CLV}$ is a linear velocity (m/s) in writing or reproducing information, r is a radial position (mm) on the optical medium, and P is an average track pitch (μm) of the optical medium.

17. A optical medium according to claim 13, wherein a region between adjacent guide grooves is used as a single writable track or as a plurality of writable tracks.

18. A optical medium according to claim 17, wherein the ratio of track pitch/meander amplitude is not less than 100.

\* \* \* \* \*